US008306071B2

(12) United States Patent
Hiben et al.

(10) Patent No.: US 8,306,071 B2
(45) Date of Patent: Nov. 6, 2012

(54) METHOD FOR SELECTING AN OPERATING MODE BASED ON A DETECTED SYNCHORNIZATION PATTERN

(75) Inventors: Bradley M. Hiben, Glen Ellyn, IL (US); Robert A. Biggs, Evanston, IL (US); David L. Muri, Sunrise, FL (US); Donald G. Newberg, Hoffman Estates, IL (US); Darrell J. Stogner, Plantation, IL (US); Alan L. Wilson, Long Grove, IL (US); David G. Wiatrowski, Woodstock, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 1074 days.

(21) Appl. No.: 11/668,878

(22) Filed: Jan. 30, 2007

(65) Prior Publication Data
US 2008/0008153 A1  Jan. 10, 2008

Related U.S. Application Data

(63) Continuation of application No. 10/799,828, filed on Mar. 12, 2004, now Pat. No. 7,203,207.

(60) Provisional application No. 60/474,568, filed on May 30, 2003.

(51) Int. Cl.
*H04J 3/06* (2006.01)
(52) U.S. Cl. ............... 370/514; 370/503; 370/509
(58) Field of Classification Search .............. 370/503, 370/509, 514
See application file for complete search history.

(56) References Cited

U.S. PATENT DOCUMENTS

| | | | | |
|---|---|---|---|---|
| 5,257,401 A | * | 10/1993 | Dahlin et al. | 455/436 |
| 5,790,527 A | * | 8/1998 | Janky et al. | 370/330 |
| 5,842,045 A | | 11/1998 | Nakamura | |
| 5,903,562 A | * | 5/1999 | Engel et al. | 370/390 |
| 5,929,779 A | | 7/1999 | MacLellan | |
| 5,949,834 A | * | 9/1999 | Laud et al. | 375/368 |
| 6,084,932 A | | 7/2000 | Veintimilla | |
| 6,256,304 B1 | | 7/2001 | Vayrynen | |
| 6,292,484 B1 | | 9/2001 | Oliver | |
| RE37,494 E | | 1/2002 | Cantoni et al. | |
| 6,400,751 B1 | | 6/2002 | Rodgers | |

(Continued)

FOREIGN PATENT DOCUMENTS
WO  WO9926364 A1  5/1999

OTHER PUBLICATIONS

Project 25 FDMA Common Air Interface; SP-3-4080 to be published as TIA/EIA 102.BAAA Draft Revision K; Sep. 6, 2002 prepared by Motorola, Inc.

(Continued)

*Primary Examiner* — Jason Mattis
(74) *Attorney, Agent, or Firm* — Valerie M. Davis; Terri Hughes Smith; Kenneth A. Haas

(57) ABSTRACT

A method includes: receiving a burst including payload and a synchronization field, wherein the synchronization field contains a synchronization pattern; selecting, from a plurality of expected synchronization patterns, a target synchronization pattern dependent on an operating mode; comparing the received synchronization pattern against the target synchronization pattern; and if the received synchronization pattern is of the target synchronization pattern, processing the payload; otherwise, discarding the burst.

7 Claims, 7 Drawing Sheets

U.S. PATENT DOCUMENTS

| | | | |
|---|---|---|---|
| 6,643,469 | B1 | 11/2003 | Gfeller et al. |
| 6,714,557 | B1 | 3/2004 | Smith et al. |
| 7,184,466 | B1 * | 2/2007 | Seemann et al. ............. 375/219 |
| 7,369,485 | B2 * | 5/2008 | Halford et al. ............. 370/208 |
| 2002/0085516 | A1 | 7/2002 | Bridgelall |
| 2002/0089948 | A1 | 7/2002 | Pucheu-Marque et al. |
| 2003/0061558 | A1 | 3/2003 | Fackenthai et al. |
| 2003/0193963 | A1 | 10/2003 | Wright et al. |
| 2004/0083393 | A1 | 4/2004 | Jordan et al. |
| 2004/0228270 | A1 | 11/2004 | Chen et al. |
| 2004/0240465 | A1 | 12/2004 | Newberg et al. |
| 2004/0246136 | A1 | 12/2004 | Sanoner et al. |
| 2005/0047367 | A1 | 3/2005 | Lakkis |
| 2007/0149130 | A1 * | 6/2007 | Dunham ................. 455/67.11 |

OTHER PUBLICATIONS

Supplemental Notice of Allowability mailed Jan. 10, 2007 in counterpart U.S. Appl. No. 10/799,828, Bradley M. Hiben, filed Mar. 12, 2004.
Notice of Allowance mailed Nov. 13, 2006 in counterpart U.S. Appl. No. 10/799,828, Bradley M. Hiben, filed Mar. 12, 2004.
Non Final Office Action mailed May 30, 2006 in counterpart U.S. Appl. No. 10/799,828, Bradley M. Hiben, filed Mar. 12, 2004.
Final Office Action mailed Nov. 3, 2005 in counterpart U.S. Appl. No. 10/799,828, Bradley M. Hiben, filed Mar. 12, 2004.
Non Final Office Action mailed May 17, 2005 in counterpart U.S. Appl. No. 10/799,828, Bradley M. Hiben, filed Mar. 12, 2004.
International Search Report and Written Opinion for counterpart International Application No. PCT/US04/13265 mailed on Aug. 23, 2005.
International Preliminary Report on Patentability for counterpart International Application No. PCT/US04/13265 mailed on Dec. 15, 2005.
Office Action mailed Apr. 12, 2006 in Counterpart Great Britain Patent Application No. GB0523928.0.
Office Action mailed Nov. 13, 2006 in Counterpart Great Britain Patent Application No. GB0523928.0.
Office Action mailed Apr. 10, 2007 in Counterpart Great Britain Patent Application No. GB0523928.0.
Notice of Allowance mailed May 6, 2008 in Counterpart Great Britain Patent Application No. GB0523928.0.
Notice of Allowance mailed Jun. 4, 2008 in Counterpart Great Britain Patent Application No. GB0523928.0.
Office Action mailed Jul. 16, 2007 in Counterpart Canadian Patent Application No. 2527142.
Notice of Allowance mailed Jul. 7, 2008 in Counterpart Canadian Patent Application No. 2527142.
Office Action mailed Dec. 12, 2006 in Counterpart Australian Patent Application No. 2004246135.
Notice of Allowance mailed Sep. 3, 2007 in Counterpart Australian Patent Application No. 2004246135.
Modified Substantive Examination Clear Report mailed Oct. 23, 2007 in Counterpart Malaysian Patent Application No. PI20041885.
Notice of Allowance mailed Oct. 30, 2007 in related U.S. Appl. No. 10/799,913, Donald G. Newberg, filed Mar. 12, 2004.
Non final Office Action mailed Apr. 16, 2007 in related U.S. Appl. No. 10/799,913, Donald G. Newberg, filed Mar. 12, 2004.
Non final Office Action mailed Feb. 5, 2007 in related U.S. Appl. No. 10/799,913, Donald G. Newberg, filed Mar. 12, 2004.
Final Office Action mailed Aug. 25, 2006 in related U.S. Appl. No. 10/799,913, Donald G. Newberg, filed Mar. 12, 2004.
Non final Office Action mailed May 17, 2006 in related U.S. Appl. No. 10/799,913, Donald G. Newberg, filed Mar. 12, 2004.
Final Office Action mailed Nov. 30, 2005 in related U.S. Appl. No. 10/799,913, Donald G. Newberg, filed Mar. 12, 2004.
Non final Office Action mailed Jul. 6, 2005 in related U.S. Appl. No. 10/799,913, Donald G. Newberg, filed Mar. 12, 2004.
Non final Office Action mailed Nov. 3, 2004 in related U.S. Appl. No. 10/799,913, Donald G. Newberg, filed Mar. 12, 2004.
International Search Report and Written Opinion for related counterpart International Application No. PCT/US04/13266 mailed on Dec. 1, 2004.
International Preliminary Report on Patentability for related counterpart International Application No. PCT/US04/13266 mailed on Dec. 15, 2005.
Notice of Allowance mailed Nov. 9, 2006 for related counterpart Great Britain Patent Application No. GB0523205.3.
Office Action mailed Aug. 31, 2007 for related counterpart Canadian Patent Application No. 2526926.
Notice of Allowance mailed Mar. 6, 2009 for related counterpart Canadian Patent Application No. 2526926.
Notice of Allowance mailed Dec. 12, 2006 for related counterpart Australian Patent Application No. 2004246136.
Modified Substantive Examination Clear Report mailed Sep. 28, 2007 for related counterpart Malaysian Patent Application No. PI20041886.

* cited by examiner

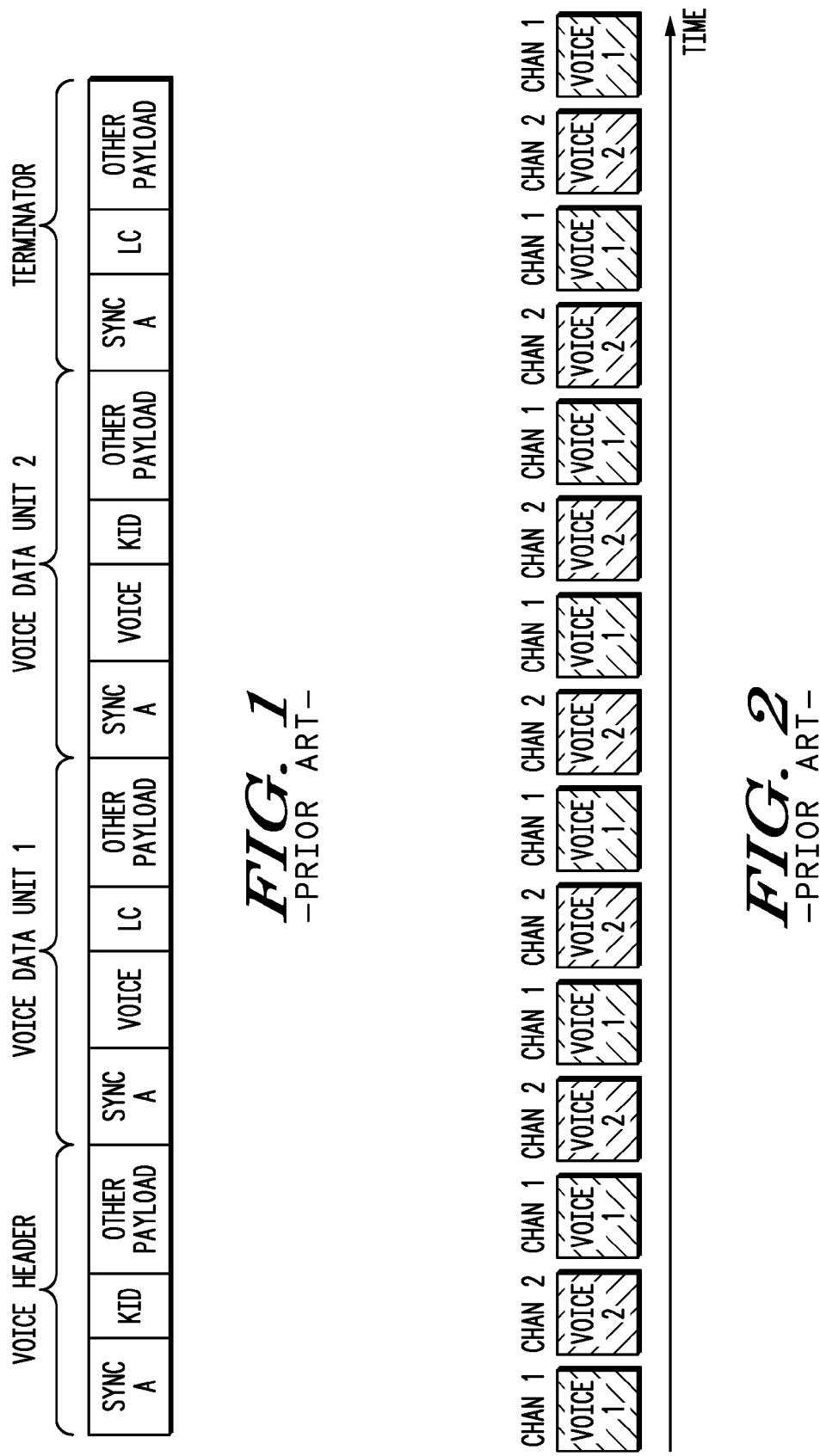

METHOD FOR SELECTING AN OPERATING MODE BASED ON A DETECTED SYNCHORNIZATION PATTERN

REFERENCE TO RELATED APPLICATIONS

The present application claims priority to the following U.S. provisional patent application commonly owned together with this application by Motorola, Inc.: Ser. No. 60/474,558, filed May 30, 2003, titled "Method for Selecting and Operating Mode based on a Detected Synchronization Pattern" by Hiben, et al.

The present invention is a continuation of and claims priority to the following U.S. patent application commonly owned together with this application by Motorola, Inc.: Ser. No. 10/799,828, filed Mar. 12, 2004, titled "Method for Selecting and Operating Mode based on a Detected Synchronization Pattern" by Hiben, et al.

FIELD OF THE INVENTION

The present invention relates generally to method for selecting an operating mode based on a detected synchronization pattern, particularly in the receiver.

BACKGROUND OF THE INVENTION

As the voice coding technology matures (i.e., the ability to encode voice with a fewer number of bits), the ability for a wireless communication system to carry at least one additional voice path on a radio frequency ("RF") communication path is desired. Due to the limited amount of RF spectrum available, there is an interest to take advantage of the improved voice coding technology in order to support the additional voice call(s) on the existing channel while still maintaining the existing RF modulation scheme, and the existing functionality of the system.

A disadvantage of supporting the additional voice call(s) on the existing channel is the reduction of the number of bits available for voice and signaling in each call. The reduction in the number of bits required to carry a voice session, however, does not wholly address the problem. Since voice communication paths also convey signaling and framing information, as the number of voice paths per RF channel increase, so does the need for additional signaling and framing information. Increasing the bit rate of the RF communication channel is not always possible as communication bandwidth or range will suffer.

FIG. 1 illustrates an existing communication protocol that supports a single voice path per channel; frequency division multiple access ("FDMA") technology is a common solution to support a single voice path per channel. Systems utilizing this protocol have a sufficient number of bits available to dedicate fields for each type of signaling, such as synchronization signaling, link control signaling, and/or the like.

As illustrated in FIG. 2, the existing channel may be divided into two or more voice paths, each supporting an independent voice call; time division multiple access ("TDMA") technology is an attractive solution to divide the existing channel into two or more voice paths. Although FIGS. 1 and 2 show a conversion from FDMA to TDMA, converting any access technology to another is applicable.

Thus, there exists a need for a method for selecting an operating mode based on a detected synchronization pattern.

BRIEF DESCRIPTION OF THE FIGURES

A preferred embodiment of the invention is now described, by way of example only, with reference to the accompanying figures in which:

FIG. 1 (prior art) illustrates a FDMA air interface;
FIG. 2 (prior art) illustrates a TDMA air interface.

DETAILED DESCRIPTION OF THE PREFERRED EMBODIMENT

Figure 3:
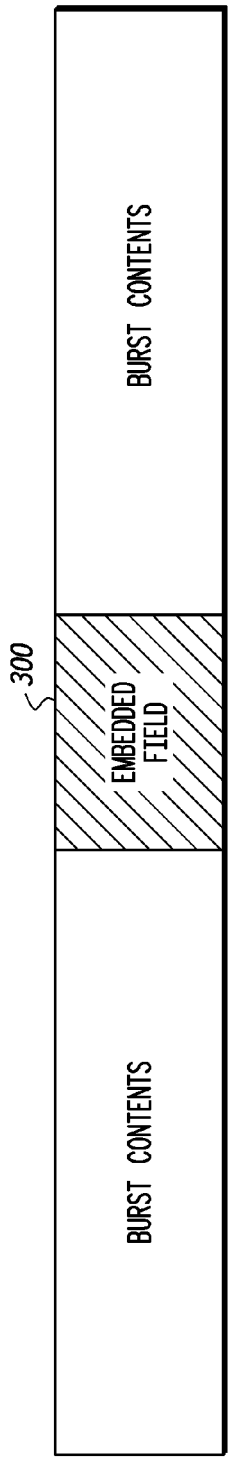
FIG. 3 illustrates a TDMA burst structure having an embedded field in accordance with the present invention.

It will be appreciated that for simplicity and clarity of illustration, elements shown in the figures have not necessarily been drawn to scale. For example, the dimensions of some of the elements are exaggerated relative to each other. Further, where considered appropriate, reference numerals have been repeated among the figures to indicate identical elements.

The present invention uses a single embedded field in a burst structure as either a synchronization field or a signaling field to maximize the utility of a limited number of bits in each burst. The present invention uses a superframe structure to define whether the single embedded field in the burst is used as a synchronization field to enable the receiving device to determine the center of a burst, or a signaling field to enable the receiving device to receive payload. The present invention uses the embedded field as a synchronization field every nth burst that marks the beginning and end of the superframe; the embedded field is used as a signaling field in all other bursts of the superframe. It should be noted that voice calls typically end on a superframe boundary, which minimizes the processing burden on the receiving device. Optionally, the present invention may use the synchronization field to enable the receiving device to, in addition to determining the center of the burst, differentiate between voice bursts and non-voice bursts, differentiate between inbound signaling and outbound signaling, and/or differentiate between a first air interface type and a second air interface type. Let us now turn to the figures to describe the present invention in further detail.

Figure 4:
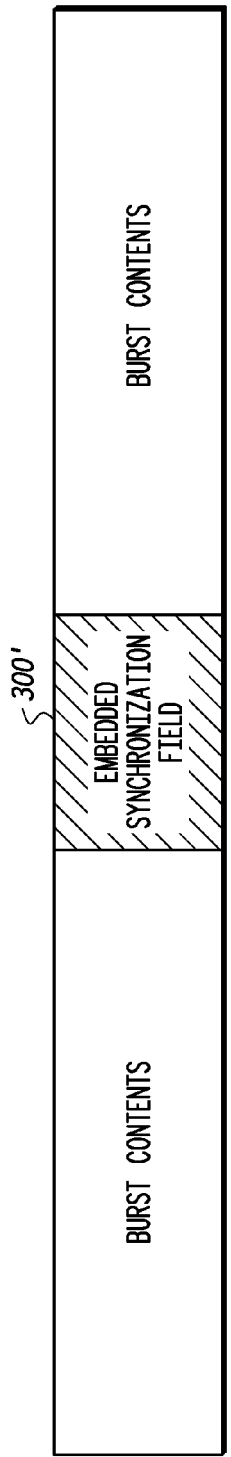
FIG. 4 illustrates the TDMA burst structure of FIG. 3, wherein the embedded field is a synchronization field in accordance with the present invention.
Figure 5:
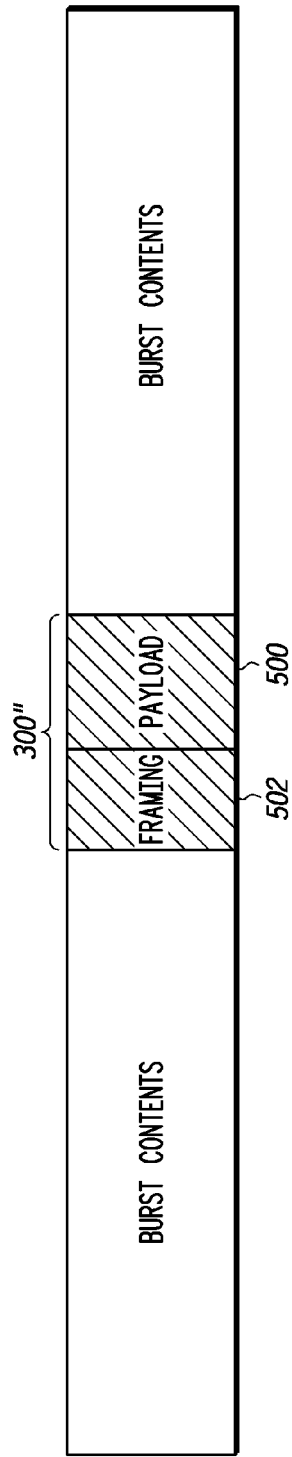
FIG. 5 illustrates the TDMA burst structure of FIG. 3, wherein the embedded field is a signaling field in accordance with the present invention.

When the number of bits available in a single burst is insufficient to provide dedicated fields for both embedded synchronization and embedded signaling, the present invention defines a burst structure having a single embedded field 300 that is able to support either synchronization or signaling as needed, as generally illustrated in FIG. 3; specifically, FIG. 4 illustrates the embedded field being used as a synchronization field 300', and FIG. 5 illustrates the embedded field being used as a signaling field 300" comprising payload 500 and framing for the payload 502. The burst contents can be of any type, such as, voice, data, or control. It should be noted that even though FIGS. 3-5 position the embedded field 300 in the center of the burst, the embedded field 300 can be positioned anywhere within the burst.

Figure 6:
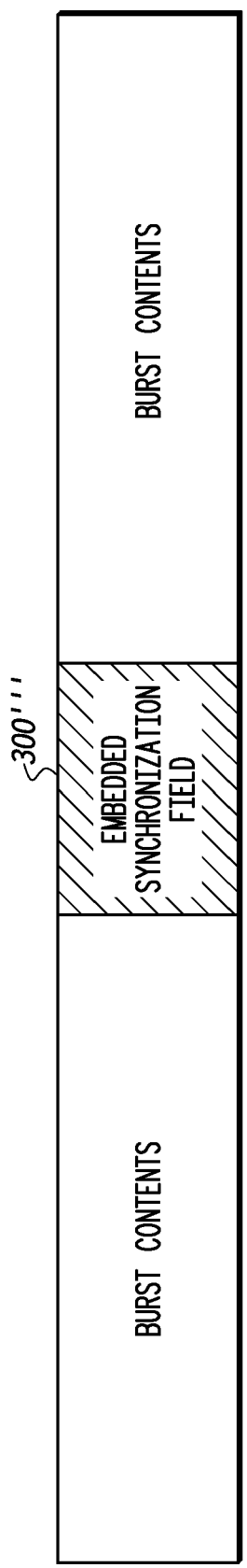
FIG. 6 illustrates a shortened-length TDMA burst structure, wherein the embedded field is a synchronization field in accordance with the present invention.
Figure 7:
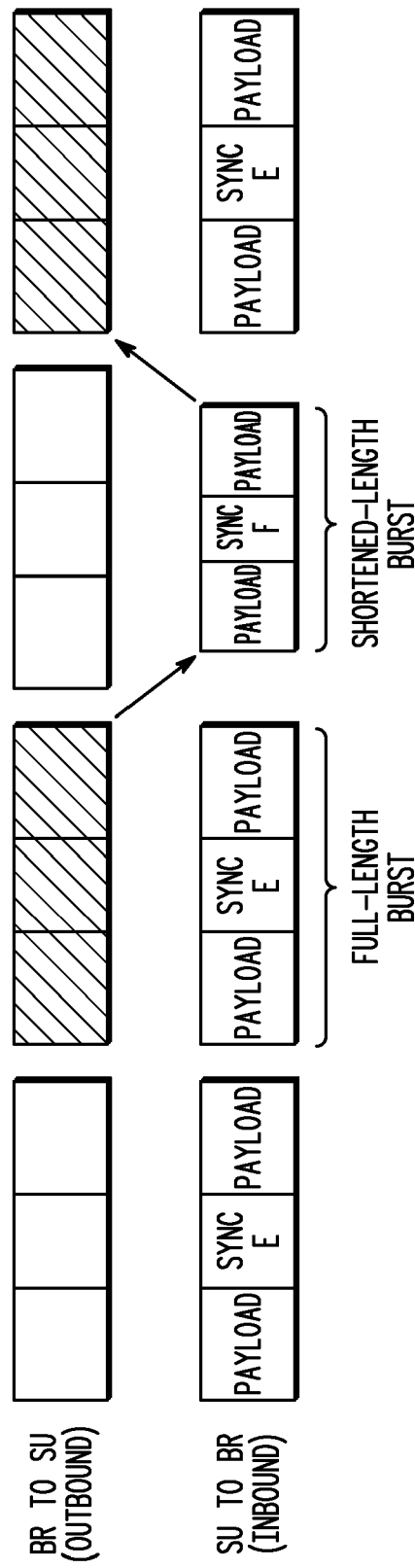
FIG. 7 illustrates an example of differentiating between a full-length TDMA burst and a shortened-length TDMA burst based on the synchronization pattern in accordance with the present invention.

FIGS. 3-5 illustrate a full (normal)-length TDMA burst structure, however, a shortened-length TDMA burst structure may be desirable as illustrated in FIG. 6. A shortened-length burst structure allows a receiving device to briefly transition to a transmit mode within a single TDMA time slot in order to transmit information back to the source (via a reverse channel) without interrupting its reception of information from the source as illustrated in FIG. 7. For example, a subscriber unit that is receiving a voice transmission from a base radio may use the shortened-length TDMA burst to transmit control information (e.g., call quality estimates) on the inbound reverse channel to the base radio without missing any of the outbound voice bursts intended for the subscriber unit.

Figure 8:
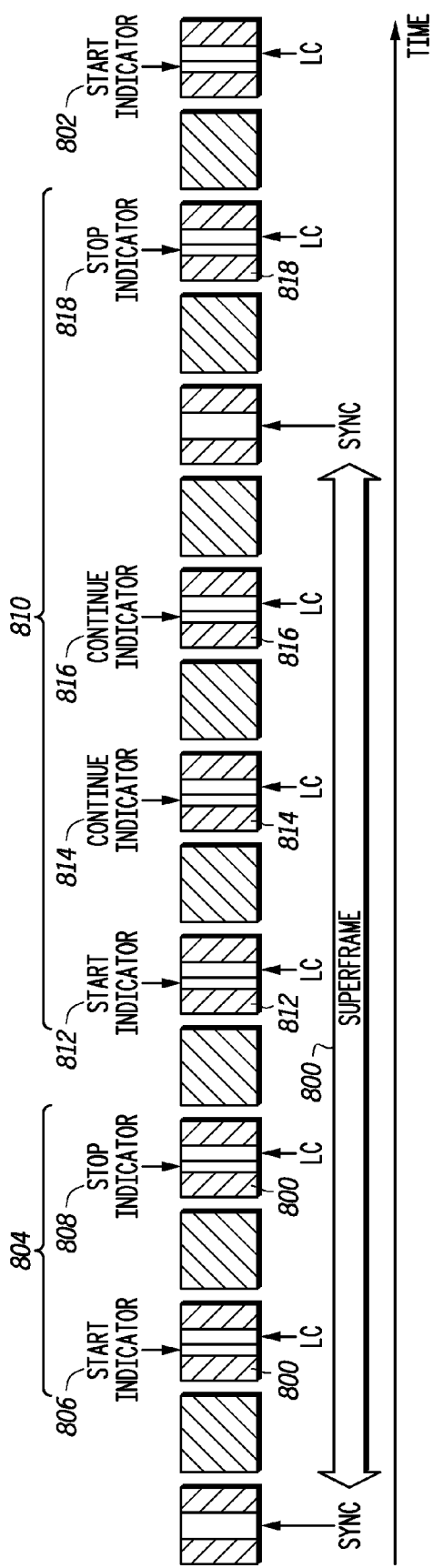
FIG. 8 illustrates an example of a superframe timing-diagram comprising variable length packets in accordance with the present invention.

Referring now to FIG. 8, for ease of explanation, it is assumed that the burst contents comprise voice. During a voice call, synchronization is transmitted periodically (e.g., every nth burst) in the embedded field 300' to define the boundaries of a superframe 800. Signaling is transmitted in the embedded field 300" of the remaining bursts in the superframe 800.

As noted above in FIG. 5, the signaling in the embedded field 800 is preferably divided into two portions: a framing portion 502 and a payload portion 500. In the preferred embodiment of the present invention, the framing portion 502 of the embedded signaling field 300" comprise an indicator 802 to mark at least the beginning and the end of a variable length packet. Such an indicator 802 allows the receiving device to determine the boundaries of a packet when variable length packets are transmitted over the channel 100. As illustrated in FIG. 8, for example, the first packet 804 requires two bursts 806, 808 to be transported over the channel 100, and the second packet 810 requires four bursts 812, 814, 816, 818 to be transported over the channel 100; FIG. 8 further illustrates how the indicators 802 mark at least the beginning and the end of each packet. It should be noted, as illustrated in the figures, that a packet does not necessarily have to begin and end within a single superframe 800.

Figure 9:
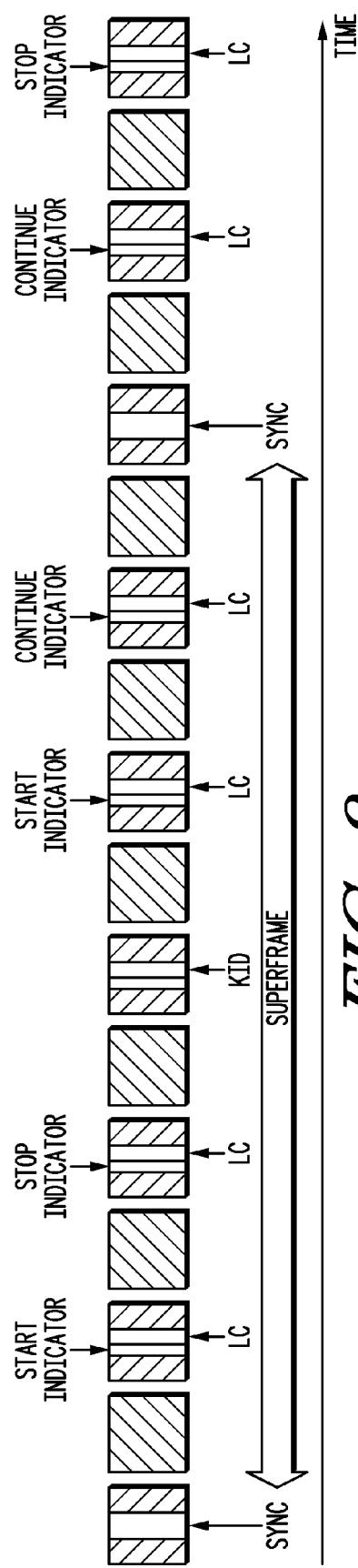
FIG. 9 illustrates an example of the superframe timing-diagram of FIG. 6 modified to comprise a key identifier in accordance with the present invention.

Typically, a first type of information, such as link control ("LC") signaling, and information used to frame the first type of information is carried in the plurality of bursts comprising the embedded signaling field in the superframe. The present invention, however, is capable of carrying at least a second type of information in at least one of the bursts comprising the embedded signaling field in the superframe while still maintaining the framing for the first type of information. When the second type of information is present in the superframe, the receiving device knows a priori the location of the burst(s), with respect to the superframe, carrying the embedded signaling field having the second type of information; typically the location of the burst(s) comprising the second type of information is the same in each superframe. As such, the receiving device frames the payload in each burst comprising the embedded signaling field, and processes the payload as a first type of information, except for those bursts known a priori by the receiving device to contain payload of the second type of information, in which the receiving device processes accordingly. For example, as illustrated in FIG. 9, the first type of information is link control signaling, and the second type of information is an encryption parameter (e.g., a key identifier (KID), an algorithm identifier (ALGID), or the like). Similar to FIG. 8, the second packet still requires four bursts to be transported over the channel as illustrated in FIG. 9; however, additional time is required to complete the transmission of the second packet in FIG. 9 since one of the bursts is used for transporting the second type of information.

Figure 10:
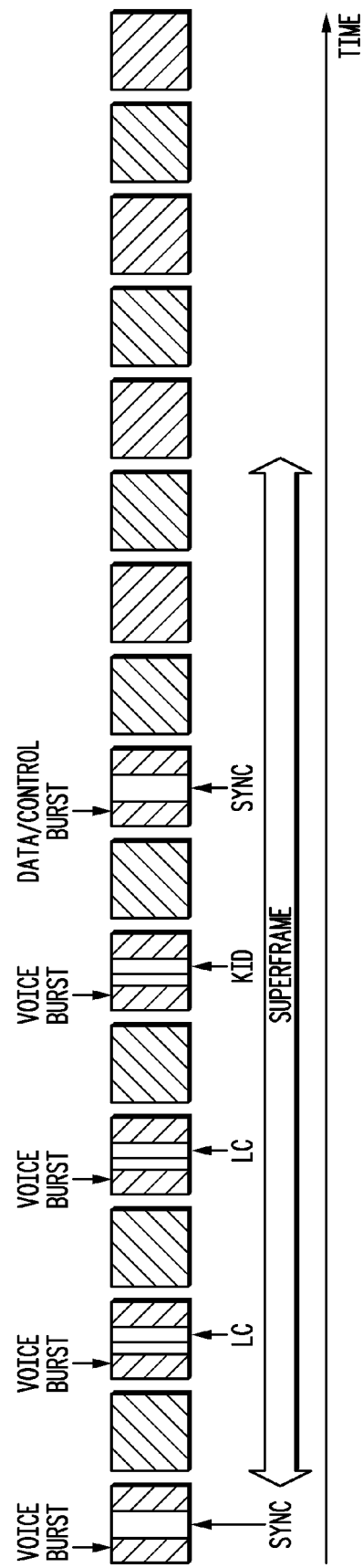
FIG. 10 illustrates an example of a voice call terminating on a non-superframe boundary in accordance with the present invention.

Continuing with the example of voice calls, voice calls are typically ended on superframe boundaries in order to minimize the processing power on the receiving device; in other words, the receiving device only has to analyze the first burst in each superframe, as opposed to analyzing every burst in the superframe, to verify whether voice is present in the burst (i.e., to determines whether the voice call has ended). It should be noted, however, that it is possible to end the voice call prior to the end of the superframe by transmitting data and/or control in accordance with the present invention. As illustrated in FIG. 10, the superframe comprises a plurality of bursts; wherein the first burst indicates the start of the current superframe as described above. In this example, early termination of the voice call is signaled by the presence of a non-voice burst (in this case, the fifth burst on the channel) prior to the end of the superframe. The non-voice burst comprises an embedded synchronization field, and the synchronization pattern embedded in the non-voice burst is preferably differentiated from the synchronization patterns embedded in voice bursts indicating the beginning and ending of the superframe, however the present invention is not limited to differentiating the synchronization patterns.

At this point, the foregoing description described how the present invention uses a single embedded field in a burst structure as either the synchronization field or the signaling field to maximize the utility of the limited number of bits in each burst; how the present invention uses the embedded signaling field to carry at least two types of information in a single superframe while maintaining the framing for the first type of information; and how the present invention allows a voice call to end on a non-superframe boundary. The following description will now describe how the present invention uses the synchronization field to further enable the receiving device to set its operating parameters to differentiate between, for example, voice bursts and non-voice bursts, inbound signaling and outbound signaling, and/or a first air interface type and a second air interface type. Let us now refer to FIGS. 11 and 12 in detail.

Figure 11:
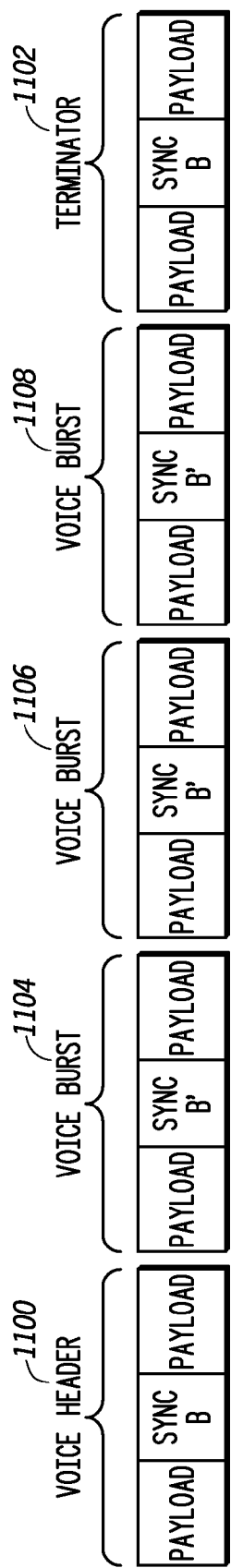
FIG. 11 illustrates an example of differentiating between voice burst and non-voice bursts based on the synchronization pattern in accordance with the present invention.

As noted above, synchronization is typically achieved by matching a received synchronization pattern against an expected synchronization pattern. The present invention uses multiple synchronization patterns to signal the selection of various operating parameters. In a first example, the embedded synchronization field 300' is used to enable the receiving device to differentiate between voice burst and non-voice bursts in accordance with the present invention. The present invention assumes that the burst structure of each voice burst and each non-voice burst utilize the same embedded synchronization field 300' illustrated in FIG. 4 even though the burst content is quite different between the two. To avoid using dedicated bits to differentiate between a voice burst and a non-voice burst, the present invention utilizes different synchronization patterns such that the receiving device can utilize pattern matching to differentiate voice bursts from non-voice bursts. Preferably, the synchronization pattern used for the voice burst and the synchronization pattern used for the non-voice burst are complements of each other (for example, but not limited to, the bits/symbols of the synchronization pattern used for the voice bursts have the opposite polarity of the bits/symbols of the synchronization pattern used for the non-voice bursts), thus allowing the receiving device to utilize a single pattern-matching algorithm to detect both synchronization patterns, however the present invention is not limited to such. For example, as illustrated in FIG. 11, the non-voice bursts (the voice header and the terminator) 1100, 1102 use synchronization pattern B, while the voice bursts 1104, 1106, 1108 use the complement, synchronization pattern B'.

Figure 12:
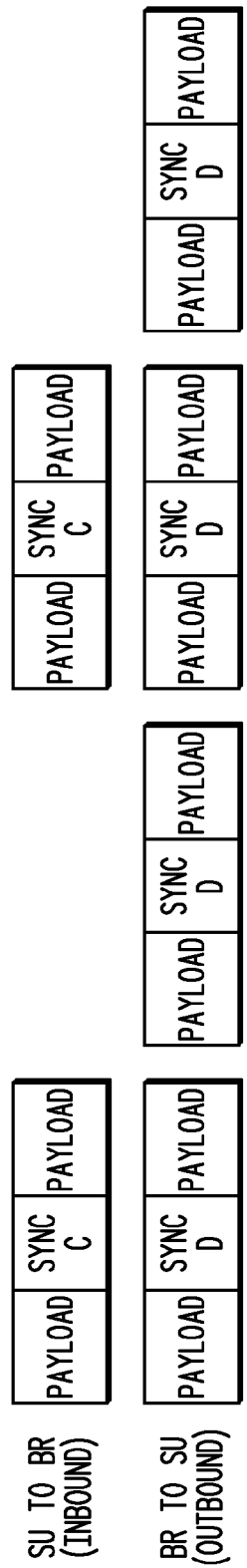
FIG. 12 illustrates an example of differentiating between inbound signaling and outbound signaling based on the synchronization pattern in accordance with the present invention.

In a second example, the embedded synchronization field 300' is used to enable the receiving device to differentiate between inbound signaling and outbound signaling in order to reject spurious signals from other systems or devices in accordance with the present invention. Again, the present invention assumes that the burst structure of each burst utilize the same embedded synchronization field 300' illustrated in FIG. 4. As illustrated in FIG. 12, the bursts being transmitted inbound (i.e., from the subscriber unit to the base radio) use a different synchronization pattern in the embedded synchronization field than bursts being transmitted outbound (i.e., from the base radio to the subscriber unit) in accordance with the present invention; in other words, inbound bursts use synchronization pattern C while outbound bursts use synchronization pattern D. Preferably, these synchronization patterns are highly uncorrelated such that a receiving device expecting an inbound transmission will not detect an outbound transmission from another device and/or system, and vice versa.

In yet a third example, the embedded synchronization field 300' is used to enable the receiving device to differentiate between different air interface types in accordance with the present invention. Differentiating between different air interfaces allows the receiving device to select the appropriate operating parameters (such as modulation type, frame/burst formats, bandwidth, or the like) for the given air interface. In the present invention, each air interface type has a different synchronization pattern associated therewith; for example, FIG. 1 illustrates a first air interface type (e.g., FDMA) having synchronization pattern A associated therewith, and FIG. 11 illustrates a second air interface type (e.g., TDMA) having synchronization pattern B associated therewith. Preferably, these synchronization patterns are highly uncorrelated in order to maximize the likelihood of the receiving device differentiating a first air interface from a second air interface. In this embodiment, the receiving device compares the received synchronization pattern to the two expected synchronizations patterns; it should be noted that the number of expected synchronization patterns in which the receiving device compares against the received synchronization pattern is dependent on the number of different air interface types available to the receiving device; the expected synchronization pattern that is substantially similar to the received synchronization pattern identifies which air interface type is being used, and enables the receiving device to set its operating parameter accordingly.

In yet a fourth example, the embedded synchronization field is used to enable the receiving device to differentiate between a full-length TDMA burst as illustrated in FIG. 4 and a shortened-length TDMA burst as illustrated in FIG. 6 in accordance with the present invention. The present invention assumes that the length of the embedded synchronization field of the full-length TDMA burst 300' and the length of the embedded synchronization field of the shortened-length TDMA burst 300''' are the same, even though the length of the burst contents are different. Since the lengths of the burst contents are different, the receiving device must process the burst contents differently. As noted above, to avoid using dedicated bits to differentiate between a full-length burst and a shortened-length burst, the present invention utilizes different synchronization patterns such that the receiving device can utilize pattern matching to differentiate the full-length and shortened-length burst. This differentiation in synchronization patterns allows the receiving device to know how to process the payload. For example, as illustrated in FIG. 7, the full-length bursts uses synchronization pattern E while the shortened-length burst uses synchronization pattern F.

Figure 13:
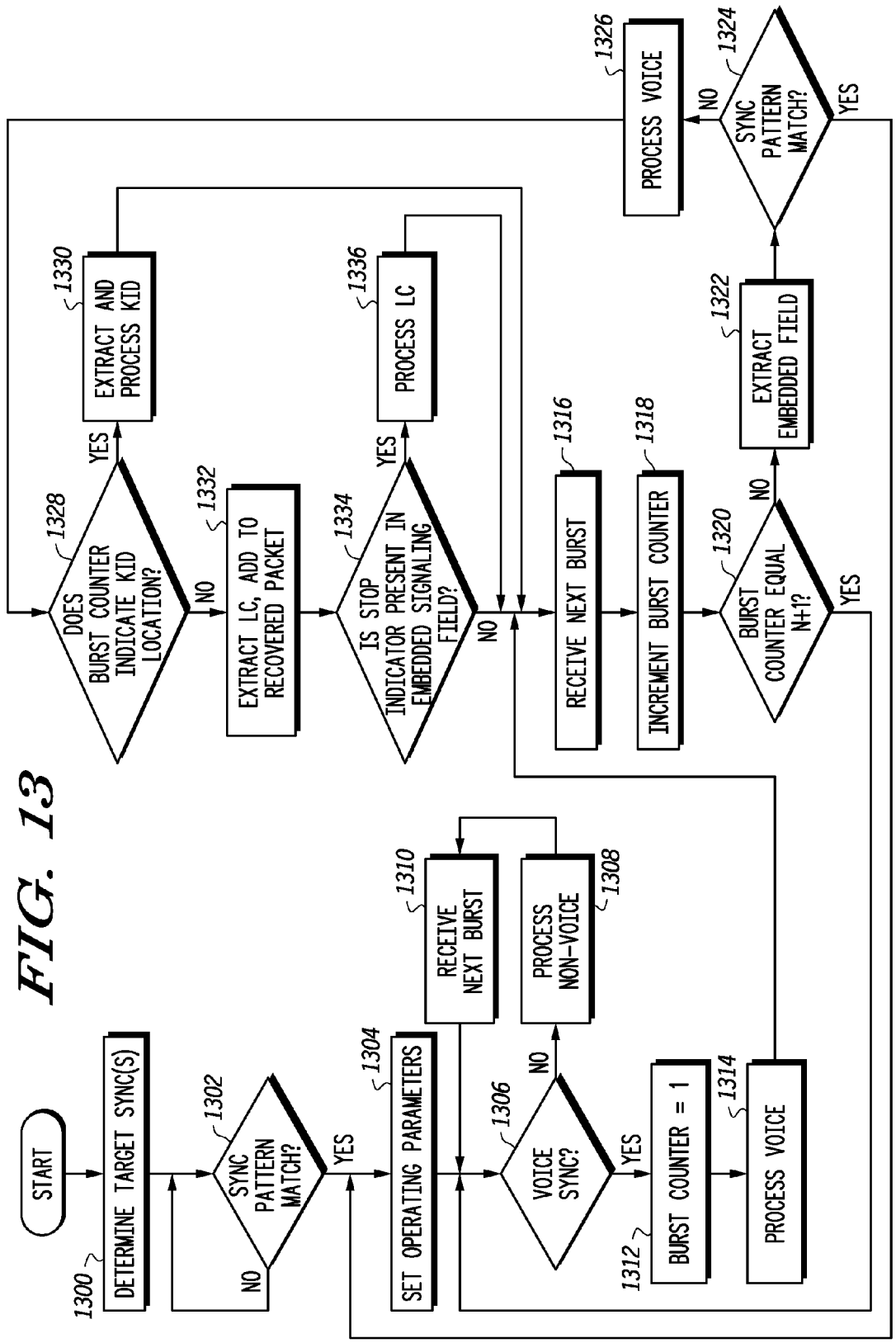
FIG. 13 illustrates a flowchart of the operation of the receiving device in accordance with the present invention.

Referring to FIG. 13, let us now discuss an example of the operation flow of the receiving device in accordance with the present invention. The example operation flow illustrated in FIG. 13 assumes that there are two types of information being transported in the embedded signaling field as described in FIG. 9: link control signaling, and the encryption parameter. Further, the present invention assumes that embedded synchronization field enables the receiving device to determine the center of a burst, to differentiate between multiple air interface types, and to differentiate between voice bursts and non-voice bursts, as described with respect to FIG. 11.

As illustrated, when the receiving device needs to acquire a channel (e.g., upon power-up, upon handoff, etc.), it determines a target synchronization pattern(s) to search for on the channel (at step 1300). The target synchronization pattern may be determined based on an expected operating mode, such as the expectation of one of an inbound channel, outbound channel, forward channel, reverse channel, subscriber transmission, base station transmission, repeated transmission, and non-repeated transmission. Alternatively, multiple target synchronization patterns may be determined based on multiple expected operating modes, such as TDMA versus FDMA. Once the target synchronization pattern is determined, the receiving device performs a pattern-matching algorithm on the channel until the target synchronization pattern is matched as known to those individuals ordinarily skilled in the art (at step 1302).

Once the target synchronization pattern is matched, the receiving device sets its operating parameters (and possibly its operating mode) based on the target synchronization pattern, and its timing information (at step 1304). The operating parameters and mode may be, but are not limited to, gain compensation, frequency offset compensation, timing information, format of the particular air interface, or the like.

At this point, the receiving device determines the type of contents of the burst (e.g., voice burst, non-voice burst, etc.) based on the synchronization pattern (at step 1306). When the synchronization pattern indicates that the contents of the burst are non-voice, the receiving device processes the non-voice information (at step 1308). The receiving device determines the type and processes the contents of subsequent bursts based on the synchronization pattern until a voice burst is detected (at steps 1308 and 1306).

When the synchronization pattern indicates that the contents of the burst are voice (at step 1306), the receiving device initializes a burst counter to represent the start of the superframe (at step 1312), and processes the voice (at step 1314). The receiving device knows a priori the number of bursts, N, that comprise the superframe. Upon receipt of each subsequent burst (at step 1316), the burst counter is incremented to indicate the location of the current burst relative to the superframe (at step 1318). Each time the burst counter is incremented, the receiving device determines whether the current burst indicates the start of a new superframe (at step 1320). If the current burst does indicate the start of a new superframe (i.e., if the burst counter equals N+1), the receiving device repeats the above process starting at step 1306 to determine whether the voice call has ended, and process the burst accordingly.

If the current burst does not indicate the start of a new superframe (i.e., if the burst counter is less than N+1), the receiving device extracts the bit pattern from the embedded field (at step 1322) and attempts to match the extracted bit pattern to the at least the one target synchronization pattern (at step 1324).

If the extracted bit pattern is substantially similar to one of the target synchronization patterns, the receiving device assumes that the voice call has ended on a non-superframe boundary and repeats the above process starting at step 1304 to set the operating parameters (and possibly its operating mode) based on the target synchronization pattern which was substantially similar to the extracted bit pattern from the current burst. If the extracted bit pattern is not substantially similar to one of the target synchronization patterns, the receiving device assumes the current burst is a voice burst and processes the voice accordingly (at step 1326).

Once the voice is processed, since the receiving device knows the location of the burst(s) comprising the second type of information, the receiving device determines whether the embedded signaling field comprises LC signaling (i.e., the first type of information) or the encryption parameter (i.e., the second type of information) based on the value of the burst counter (at step 1328). If the burst counter indicates that the current burst comprises the encryption parameter, the receiving device extracts the encryption parameter from the embedded signaling field and processes the encryption parameter accordingly (at step 1330). If the burst counter indicates that the current burst comprises LC signaling, the receiving device extracts the LC signaling from the embedded signaling field, and adds the LC signaling to the recovered packet in memory (at step 1332). The receiving device further determines whether the indicator 802 in the framing portion 502 of the embedded signaling field 300" indicates that the current burst completes the entire packet; in other words that the entire packet has been recovered (at step 1334). If the entire packet has been recovered, the receiving device processes the recovered packet accordingly (at step 1336) and clears the memory in anticipation of the next LC signaling. If the entire packet, however, has not been recovered, the receiving device awaits the next burst and repeats the above process starting at step 1316.

While the invention has been described in conjunction with specific embodiments thereof, additional advantages and modifications will readily occur to those skilled in the art. The invention, in its broader aspects, is therefore not limited to the specific details, representative apparatus, and illustrative examples shown and described. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

We claim:

1. In a wireless communication system, a method comprising the steps of:
   receiving a burst comprising payload and a synchronization field used to synchronize voice bursts and non-voice bursts, wherein the synchronization field comprises a synchronization pattern;
   comparing the received synchronization pattern against a first known synchronization pattern and a second known synchronization pattern;
   if the received synchronization pattern is of the first known synchronization pattern, operating as a first air interface type associated with a first frequency; and
   if the received synchronization pattern is of the second known synchronization pattern, operating as a second air interface type associated with a second frequency;
   wherein the synchronization pattern used for voice bursts have an opposite polarity of bits/symbols of a synchronization pattern used for non-voice bursts.

2. The method of claim 1, wherein the first known synchronization pattern and the second known synchronization pattern are uncorrelated.

3. The method of claim 1, wherein the first air interface type is FDMA and the second air interface type is TDMA.

4. The method of claim 1 further comprising the step of setting operating parameters based on the received synchronization pattern.

5. In a wireless communication system, a method comprising the steps of:
   receiving a burst comprising payload and a synchronization field, wherein the synchronization field comprises a synchronization pattern used to synchronize voice bursts and non-voice bursts;
   selecting, from a plurality of expected synchronization patterns, a target synchronization pattern dependent on an operating mode;
   comparing the received synchronization pattern against the target synchronization pattern; and
   if the received synchronization pattern is of the target synchronization pattern, processing the payload; otherwise, discarding the burst
   wherein the synchronization pattern used for voice bursts have an opposite polarity of bits/symbols of a synchronization pattern used for non-voice bursts.

6. The method of claim 5 wherein the operating mode is the expectation of one of an inbound channel, outbound channel, forward channel, reverse channel, subscriber transmission, base station transmission, repeated transmission, and non-repeated transmission.

7. The method of claim 5 further comprising the step of setting operating parameters based on the target synchronization pattern.

* * * * *